(12) United States Patent
Brodt (10) Patent No.: US 9,458,030 B2
(45) Date of Patent: Oct. 4, 2016

(54) METHODS OF DESALINATION AND RINSING, AND SYSTEMS THEREFOR

(71) Applicant: S.G.B.D. TECHNOLOGIES LTD., Haifa (IL)

(72) Inventor: Alexander Brodt, Beer Sheva (IL)

(73) Assignee: S.G.B.D. TECHNOLOGIES LTD., Haifa (IL)

( * ) Notice: Subject to any disclaimer, the term of this patent is extended or adjusted under 35 U.S.C. 154(b) by 41 days.

(21) Appl. No.: 14/010,690

(22) Filed: Aug. 27, 2013

(65) Prior Publication Data
US 2015/0047388 A1    Feb. 19, 2015

(30) Foreign Application Priority Data

Aug. 13, 2013    (IL) .......................................... 227948

(51) Int. Cl.
| | |
|---|---|
| C02F 1/22 | (2006.01) |
| C02F 1/24 | (2006.01) |
| C02F 103/08 | (2006.01) |
| C02F 103/10 | (2006.01) |

(52) U.S. Cl.
CPC ............. *C02F 1/22* (2013.01); *C02F 2103/08* (2013.01); *C02F 2103/10* (2013.01)

(58) Field of Classification Search
CPC ....... C02F 11/20; Y10S 159/05; B01D 9/00; B01D 9/0004
See application file for complete search history.

(56) References Cited

U.S. PATENT DOCUMENTS

| | | | | |
|---|---|---|---|---|
| 2,613,513 A | * | 10/1952 | Shields | .............................. 62/66 |
| 3,213,633 A | * | 10/1965 | Ludwig Rosenstein et al. | ............................... 62/535 |
| 4,164,854 A | * | 8/1979 | Martin | ............................ 62/536 |

FOREIGN PATENT DOCUMENTS

RU    2 186 034    7/2002

OTHER PUBLICATIONS

ICSC 0036—Dibutyl Phthalate—Mar. 7, 2002.*
I.N. Orekhov and V.D. Obrezkov, "Cold in Chemical Technology Processes", Leningrad, 1980, p. 194.

* cited by examiner

*Primary Examiner* — Krishnan S Menon
*Assistant Examiner* — Bradley R Spies
(74) *Attorney, Agent, or Firm* — Pearl Cohen Zedek Latzer Baratz LLP (57) ABSTRACT

Desalination and rinsing methods and systems are provided, which use a liquid column to efficiently perform freeze desalination and enable recyclable washing of produced minerals or combustible material. The liquid column comprises alternating layers of water immiscible liquids and water solutions which form a vertical density gradient (discrete or continuous) and exhibit a lower freezing zone from which ice floats to an upper melting zone. Cooling of introduced upwards flowing salt solutions is carried out by a countering downwards flow of cold water immiscible liquid. The process is cyclical, involves few if any mechanical moving parts and is easily controllable and adaptable to varying desalination circumstances. Rinsing of minerals or combustible material may be integrated in the heat and matter flows of the desalination system to allow effective rinsing, desalination and recycling of the used water.

20 Claims, 5 Drawing Sheets

METHODS OF DESALINATION AND RINSING, AND SYSTEMS THEREFOR

CROSS REFERENCE TO RELATED APPLICATIONS

This application claims the benefit of Israeli Patent Application No. 227948 filed on Aug. 13, 2013, which is incorporated herein by reference in its entirety.

BACKGROUND OF THE INVENTION

1. Technical Field

The present invention relates to the field of desalination, and more particularly, to freeze desalination.

2. Discussion Of Related Art

Freeze desalination is a known desalination method which presents however technical difficulties in implementation, mainly due to accumulation of ice that results in a reduced thermal contact and mechanical ice removal challenges.

SUMMARY OF THE INVENTION

One aspect of the present invention provides a desalination system comprising a vertical vessel having a bottom layer of a heavy water-immiscible liquid; a brine layer on top of the bottom layer; an intermediate layer of a light water-immiscible liquid on top of the brine layer; and a top water layer on top of the intermediate layer. A density of the heavy water-immiscible liquid is selected to be larger than a density of the brine, and a density of the light water-immiscible liquid is selected to be smaller than a density of the brine and larger than a density of the top water layer. The desalination system further comprises a brine handling unit arranged to introduce brine or a dilute salt solution into the bottom layer and remove concentrated brine from the brine layer. The desalination system is arranged to freeze water in the brine layer and enable floating of the ice from the brine layer to the top water layer.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

DETAILED DESCRIPTION OF THE INVENTION

Prior to the detailed description being set forth, it may be helpful to set forth definitions of certain terms that will be used hereinafter.

The term "brine", "water" or "salt water solution" as used in this application refers to any salt water solution, dilute or concentrated. Generally, the term "brine" is used to refer to a more concentrated solution than the term "dilute salt solution", which in turn is used to refer to a more concentrated solution than the term "water". However, as the disclosed invention is flexible in its possible adjustments and application, and as the disclosed concentration processes are gradual and involve mixing of solutions of varying concentrations, these terms is to be considered as equivalent, and any use of one or the other should be understood in a non-limiting sense. Furthermore, the term "ice" as used in this application refers to any mixture of water and ice as well as to ice bodies.

The term "gradient" as used in this application refers to a monotonous change (in the weak sense) of a quantity, e.g., a step-wise change, a continuous change, ranges in which the quantity is constant and there is no change, and combinations of such conditions. In particular, the term "vertical density gradient" is to be understood to comprise any of the following: a stepwise change in density (layers of liquids having increasing densities from top to bottom), a partially continuous change in density (one or more layers having a continuously or stepwise changing density), ranges of constant density and any combination of these features. In particular, the vertical density gradient may comprise set of liquids with different densities.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

In certain embodiments, desalination and rinsing methods and systems are provided, which use a liquid column to efficiently perform freeze desalination and enable recyclable washing of produced minerals or combustible material. The liquid column comprises alternating layers of water immiscible liquids and salt solutions which form a vertical density gradient (e.g., a set of liquids with different densities) and exhibit a lower freezing zone from which ice floats to an upper melting zone. Cooling of introduced upwards flowing salt solutions is carried out by a countering downwards flow of cold water immiscible liquid. The process is cyclical, involves few if any mechanical moving parts and is easily controllable and adaptable to varying desalination circumstances. Rinsing of minerals or combustible material may be integrated in the heat and matter flows of the desalination system to allow effective rinsing, desalination and recycling of the used water.

Figure 1:
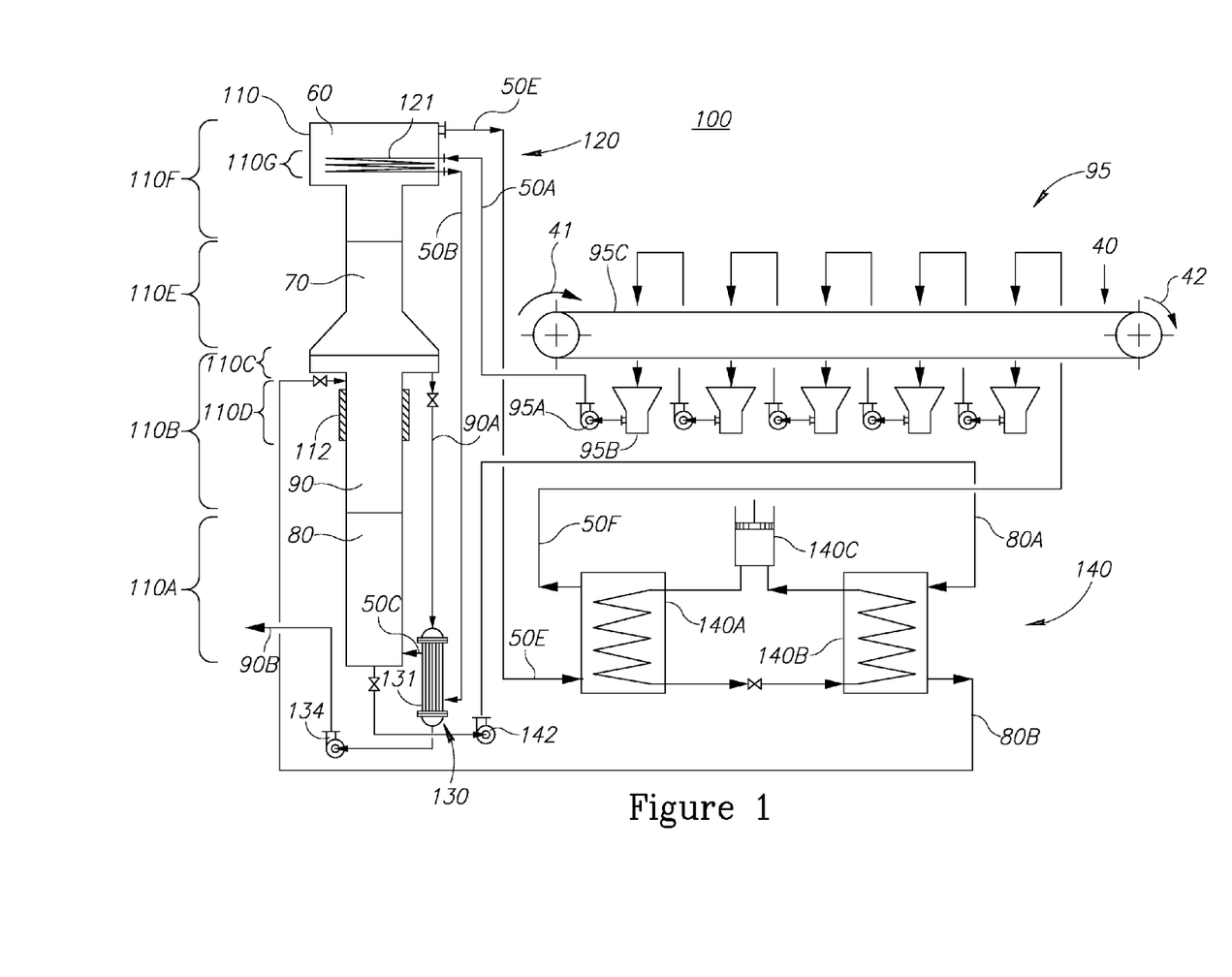
FIG. 1 is a high level schematic process diagram of an exemplary desalination and rinsing system, according to some embodiments of the invention.
Figure 2:
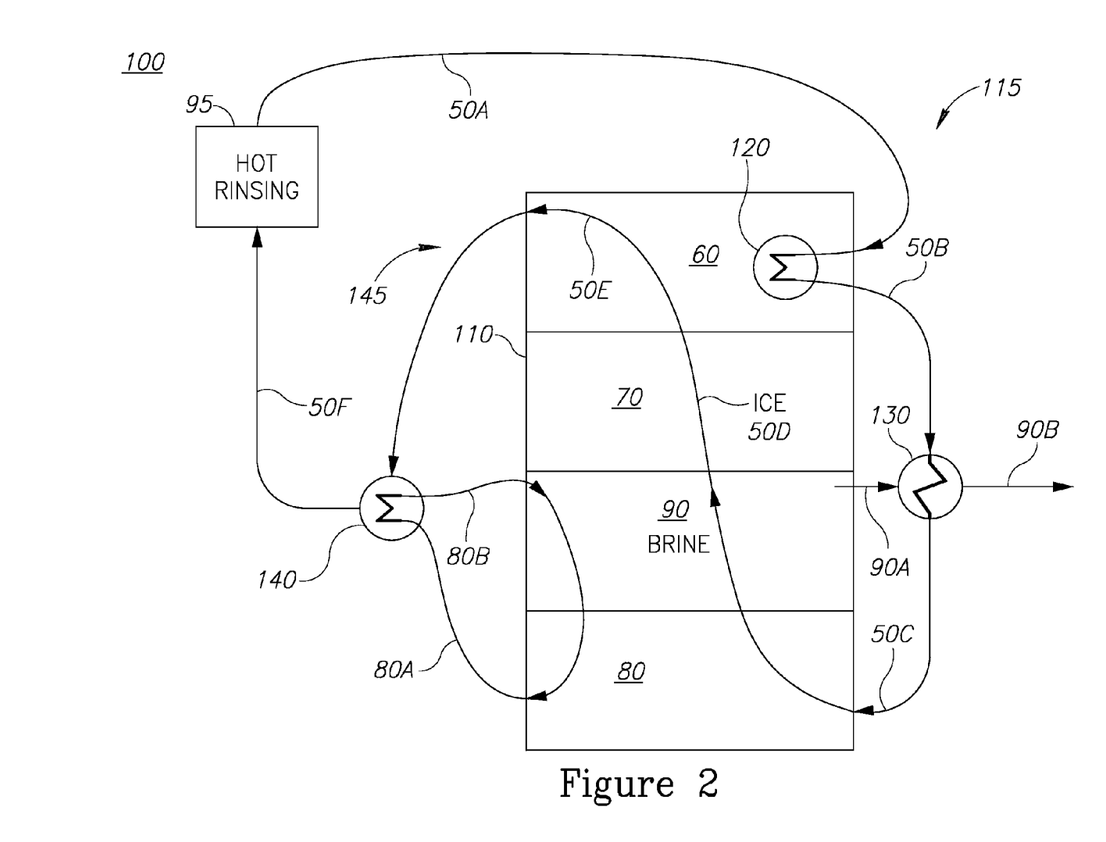
FIG. 2 is a high level schematic illustration of processes in a desalination system, according to some embodiments of the invention.

FIG. 1 is a high level schematic process diagram of an exemplary desalination and rinsing system 100, according to some embodiments of the invention. FIG. 2 is a high level schematic illustration of processes in desalination system 100, according to some embodiments of the invention. While FIG. 2 is a conceptual scheme of flows through system 100, FIG. 1 is a concrete example for a possible implementation of system 100.

Desalination system 100 comprises a vertical vessel 110 having a bottom layer 110A of a heavy water-immiscible liquid 80, a brine layer 110B with brine 90 on top of bottom layer 110A, an intermediate layer 110E of a light water-immiscible liquid 70 on top of brine layer 110B, and a top water layer 110F on top of intermediate layer 110E which comprises water and ice 60, as explained below.

A density of heavy water-immiscible liquid 80 is selected to be larger than a density of brine 90, and a density of light water-immiscible liquid 70 is selected to be smaller than a density of brine 90 and larger than a density of water and ice 60 in top water layer 110F. The density of light water-immiscible liquid 70 may be selected according to the relative proportions of water and ice in layer 110F, or be selected to be lower than ice-less water. The density of the water may be that of pure water or if water with residual dissolved salts.

In certain embodiments, sections of vessel 110 may be designed to support the processes that take place in them. For example, a freezing section 110D in brine layer 110B may be thermally insulated from its surroundings by a thermal insulation layer 112. In another example, a top part 110C of brine layer 110B may be wider than lower regions, to enable brine removal without disturbing ice floating. In yet another example, a section 110G in top layer 110F may be designed to support melting of ice 50D by heat exchanger 120. For example, heat exchanger 120 may comprise a coil-pipe 121 immersed in layer 110E of thawed water 60 accumulated as the top layer of vessel 110. The dimensions of vessel 110 and parts thereof as well as their forms and construction materials may be selected to optimize the desalination process with respect to set requirements. Vessel 110 may be constructed as a pressure vessel, and the liquid column may be pressurized.

In certain embodiments, a four-layer column is formed in the vertical working vessel during the pre-starting period. It consists of alternating water-immiscible and aqueous layers with decreasing densities (at working conditions) from the bottom to the top of the vessel (80, 90, 70, 60 respectively). The liquids may be poured successively in the order of decreasing densities with the subsequent continuous delivery of a fresh flow of the brine (50C) to be desalinated to the bottommost non-aqueous layer (110A). Simultaneously, a part of the heaviest non-aqueous liquid (80A) may be withdrawn into the external circulation loop through a refrigerating machine (140) and then returned into the over-lying brine layer (110B) which is screened by a layer of a lighter non-aqueous liquid (110E) with an intermediate density between those of the brine and clean water, which is flooded with a layer of thawed water (110F). Ice 50D that floats into the uppermost fresh-water layer (110F) is melted by heating the thawed water by blind heat exchange using the dilute water-salt solution (50A) fed for desalination, while the produced excess of fresh water is continuously delivered to the consumers. Strong brine 90A may be removed from brine layer 110B as an additional final product 90B.

Examples for heavy water-immiscible liquid 80 comprise any water-immiscible low-freezing organic compounds or their mixtures with the density exceeding that of the brine to be concentrated, such as perfluoroheptane (density 1.733 g/cm$^3$, boiling point 82.5° C., freezing temperature −78° C., in case of a non-limiting example in which brine 90 has a density up to 1.700 g/cm$^3$), hexane mixtures with tetrafluorodibromoethane, or mixtures thereof.

Additional examples for heavy water-immiscible liquid 80 may comprise organic compounds related to halogenated derivatives of aliphatic hydrocarbons, such as, e.g., cis-dibromoethylene (density 2.28 g/cm$^3$, boiling point 112.5° C., freezing temperature −53° C.) and their various mixtures. For example, a mixture of carbon tetrachloride (49% by volume) with chloroform (51% by volume) (freezing temperature −81° C.) can be used as heavy water-immiscible liquid 80, as well as even lower-freezing high-density compositions, such as the non-limiting examples listed below (the amounts of components are given in % by volume): (i) chloroform 31%, trichloroethylene 69%; (ii) chloroform 27%, methylene chloride 60%, carbon tetrachloride 13%; (iii) chloroform 20%, trans-1,2-dichloroethylene 14%, trichloroethylene 21%, ethyl bromide 45%; (iv) chloroform 14.5%, methylene chloride 25.3%, ethyl bromide 33.4%, trans-1,2-dichloroethylene 10.4%, trichloroethylene 16.4%. Other mixtures may be used according to specific requirements and according to the principles described above.

Examples for light water-immiscible liquid 70 comprise any organic liquids or mixtures of several organic liquids with an intermediate density between those of thawed water and water-salt medium (i.e., brine 90), such as phthalic acid dibutyl ether (dibutyl phthalate) (density 1.05 g/cm$^3$, boiling point 340° C., freezing temperature −35° C.) or furfural (density 1.16 g/cm$^3$, boiling point 161.7° C., freezing temperature −36.5° C.) can be used, as well as various compositions made up from different organic ingredients, such as, e.g., a mixture of hexane (density 0.66 g/cm$^3$, boiling point 69° C., freezing temperature −94° C.) with tribromofluoromethane (density 2.71 g/cm$^3$, boiling point 105° C., freezing temperature −74° C.), or a mixture of pentane (density 0.63 g/cm$^3$, boiling point 36.1° C., freezing temperature −129.7° C.) with tetrafluorodibromoethane (density 2.16 g/cm$^3$, boiling point 47.3° C., freezing temperature −110.5° C.).

In certain embodiments, some or all layers 110A, 110B, 110E and 110F have a vertically uniform density. In certain embodiments, one or more of layers 110A, 110B, 110E and 110F may have a vertically variable density (i.e., a bottom part with a density higher than an upper part) to support heat exchange and ice floating. The temperatures and possibly pressures of the liquids in the system may also be adapted to support and optimize heat exchange and ice floating.

Desalination system 100 further comprises a brine handling unit 115, arranged to introduce brine 50C into bottom layer 110A and remove concentrated brine 90A from brine layer 110B.

Desalination system 100 is arranged to freeze water in brine layer 110B and enable floating of ice 50D from brine layer 110B through intermediate layer 110E to top water layer 110F.

In certain embodiments, desalination system 100 further comprises a cooling unit 140 arranged to cool heavy water-immiscible liquid 80A from bottom layer 110A and introduce cooled heavy water-immiscible liquid 80B into brine layer 110B. Introduction of cooled heavy water-immiscible liquid 80B into brine layer 110B may promote or cause freezing of water in brine 60 to yield ice 50D, that may then float to water layer 110F.

In certain embodiments, cooling unit 140 may be arranged to cool heavy water-immiscible liquid 80A using water and/or ice 50E removed from top water layer 110F. For example, excessive water due to melting ice 50D may be delivered to cool heavy water-immiscible liquid 80A, or heavy water-immiscible liquid 80A may be transferred through a heat exchanger in thermal contact with top layer 110F or with water and/or ice therefrom.

Cooling unit 140 may be a refrigerator that receives relatively cold water 50E (as the melt product 50E from ice 50D) at heat exchanger 140A, and relatively warm heavy water-immiscible liquid 80A (which was warmed by water 50C introduced into layer 110A) at heat exchanger 140B. The respective heat exchangers 140A, 140B yield respectively warmer water 50F delivered e.g. to rinsing unit 95 and cooled heavy water-immiscible liquid 80B delivered to layer 110B to cool introduced water 50D. In certain embodiments, cooling unit 140 may use a coolant that is pumped between heat exchangers 140A, 140B by pumping unit 140C to deliver heat between liquids 50 and 80. In certain embodiments, cooling unit 140 may comprise a single heat exchanger providing direct contact between liquids 50, 80.

Desalination system 100 may further comprise at least one pre-cooling unit (e.g., 120, 130, see below) arranged to cool introduced brine 50A prior to its introduction into bottom layer 110B. For example, desalination system 100 may comprise a cooling unit 120 arranged to melt floated ice 50D in top water layer 110F to cool introduced brine 50A and/or a heat exchanger 130 arranged to use removed concentrated brine 90A to cool introduced brine 50A or 50B. Introducing pre-cooled brine 50C into vessel 110 may promote freezing of water in brine 60 to yield ice 50D, that may then float to water layer 110F.

In certain embodiments, pre-cooled brine 50C is introduced into bottom layer 110A and further cools by rising through bottom layer 110A, which is cooled by cooled heavy water-immiscible liquid 80B. Such implementation may result in countercurrent further cooling of introduced brine 50C which may be designed to lead to water freezing. While pre-cooled brine 50C may also be introduced into brine layer 110B and cooled heavy water-immiscible liquid 80B may also be introduced into bottom layer 110A, the countercurrent of these flows, as illustrated in FIGS. 1 and 2 may further enhance the cooling of introduced brine 50C and the process's overall efficiency.

In certain embodiments, pre-cooled dilute water-salt solution 50C is concentrated during its flow from layer 110A to 110F, and separated into brine (90 and 90A) and fresh (or more dilute) water (ice 50D, water 60 and 50E). Water 50C is delivered into layer 110A of heavy water-immiscible liquid 80, e.g., into the bottommost zone of layer 110A which is the base of the entire multi-step column of liquids. Due to the immiscibility of liquid 80, pre-cooled dilute water-salt solution 50C irreversibly floats up in layers 110A and 110B and is additionally cooled at the expense of mixing recuperative cold-exchange between media 80, 90 and water 50C. As a result, by the moment water 50C approaches layer 110E, its temperature decreases down to that of the beginning of ice crystallization out of it. In embodiments, formation of ice 50D may commence in any of layers 110A, 110B and 110E, depending on the process design. Since the continuous floating water-salt liquid 50C is washed by immiscible non-aqueous medium 80B, adequate conditions for the start of massive ice formation may be arranged to start in layer 110B and not in layer 110A. Generated ice 50D floating from layers 110A and/or 110B may be incorporated in dilute water-salt solution 50C before the commencement of massive ice formation. Freezing promotes further floating as ice density is smaller than water density. Upon rising be floating, ice 50D becomes coarser due to the start of massive ice formation caused by a deeper cooling of brine 90, and brine 90 is thus desalinated at the expense of counter-flow mixing cold-exchange with non-aqueous refrigerating agent 80B in layer 110B.

Without being bound by theory, fresh refrigerating agent 80A (e.g., perfluoroheptane) used in this process, which is collected after the main two-step mixing cold-exchange at the base of layer 110A, is introduced as cooled refrigerating agent 80B, after restoring its refrigerating potential in a refrigerator 140, into the uppermost zone of layer 110B, e.g. into layer 110D. This assures a common counter-flow of cold-exchanging phases (80B and 50C). Being heavier than water-salt medium 90 in layer 110B, cold heavy water-immiscible liquid 80B (e.g., perfluoroheptane) sinks in it, transferring its coldness to water-salt medium (50C and 90). Ice granules 50D floating up in the opposite direction are additionally cooled and continue coarsening, since while they are floating up, the external spherical surface of ice acquires increasingly low temperature due to counter-flow of non-aqueous refrigerating agent 80B sinking in water-salt medium 90 and further sinking in heavy water-immiscible liquid 80 of layer 110A (due to its coldness). As a result, further uniform layered ice freezing takes place on the still cooled surface of floating ice granules. At that, a stably high motivating force of cold-exchange is maintained. Hence, it is due to such a counter-flow between cold-exchanging phases organized by feeding fresh refrigerating agent 80B towards floating ice 50D that the ice-formation intensity is maintained, in contrast to known methods of brine desalination, at a stably high level.

The removal of heavy water-immiscible liquid 80A that has exhausted its cooling potential from the cold-exchange process may be realized from the lower zone of layer 110A by pumping this low-freezing liquid using pump 142 through heat exchanger 140B (e.g. an evaporator) of refrigerator 140. There, refrigerating agent 80A is cooled down to the temperature level required for concentrating the desalinated brine up to the necessary strength. After that it may enter the upper zone of layer 110B to concentrate water-salt medium 90 as described above.

In certain embodiments, desalination system 100 may further comprise a water removal unit 145 arranged to remove water and/or ice 50E from top water layer 110F. Remove water and/or ice 50E may be used to cool heavy water-immiscible liquid 80A in cooling unit 140, may serve as a product of system 100, or may be used in a rinsing unit 95 as described below.

Desalination system 100 may further comprise rinsing unit 95 arranged to remove brine 50A from delivered material 41 using water 50F from removed water and/or ice 50E (with or without using it as a cooling medium), and deliver removed brine 50A to brine handling unit 115.

In certain embodiments, the desalination system may be part of a rinsing system 100, and operate to recycle the water used during the rinsing. For example, water 50F may be used to concentrate or sort minerals or combustible material, or to carry out mechanical, thermal or chemical processes relating to minerals or combustible material. For example, brine 90 may be used as the water-salt medium described in U.S. patent application Ser. No. 13/956,418, which is used to gravitationally separate coal from waste rock, and desalination system 100 may be incorporated in the combustible material processing system described therein to treat and recycle the water-salt medium used there. As an example, an implementation of the rinsing operation is illustrated in FIG. 1 as rinsing unit 95, having a belt conveyor 95C such as band vacuum-filters which receive water 50F as a dilute water-salt solution at the ambient temperature. The rinsing water is collected (at collectors 95B) at different locations along conveyor 95C and is pumped by pumps 95A to rinse material 41 upstream on band 95C (in the illustrated case). In certain embodiments, delivered water 50F may be delivered directly from water layer 110F as water 50E (in certain embodiments, water 50E may be used for cooling heavy water-immiscible liquid 80A as explained above). Hot air 40 may be used to heat delivered water 50F and melt, if needed, ice delivered therewith. The heated water may then be delivered as water 50A for pre-cooling and melting ice within water layer 110F itself. Hot air 40 may also be used for final drying of delivered material 41 to yield dry material 42.

The uptake of regenerated strong brine 90A fed through recuperative cold-exchanger 131 to pump 134 as concentrated brine 90B for disposal or further concentration. Uptake of brine 90A may be carried out from the upper (somewhat expanded) zone 110C of layer 110B in the central part of vertical vessel 110. Zone 110C may by purposely made with a greater diameter in order to avoid the entrainment of ice 50D floating up vertically into next layer 110E of non-aqueous liquid 70 to eventually by melted and/or leave vertical vessel 110. In certain embodiments, liquid 70 may be a water-immiscible non-aqueous physiologically inert liquid that does not freeze at the temperature of ice floating up in it and has the density intermediate between those of water-salt solution and fresh water, such as dibutyl phthalate. At that, while ice 50D passes through layer 110E of dibutyl phthalate 70, residues of moistening water-salt medium (90, 50C) are washed off the surface of ice granules. Therefore, after passing through layer 110E, overcooled ice 50D continues floating up (being already clean and free of water-salt solution) to layer 110F of fresh water 60 heated by fresh rinsing water 50A delivered to the freezing-out process at the ambient temperature.

Figure 3:
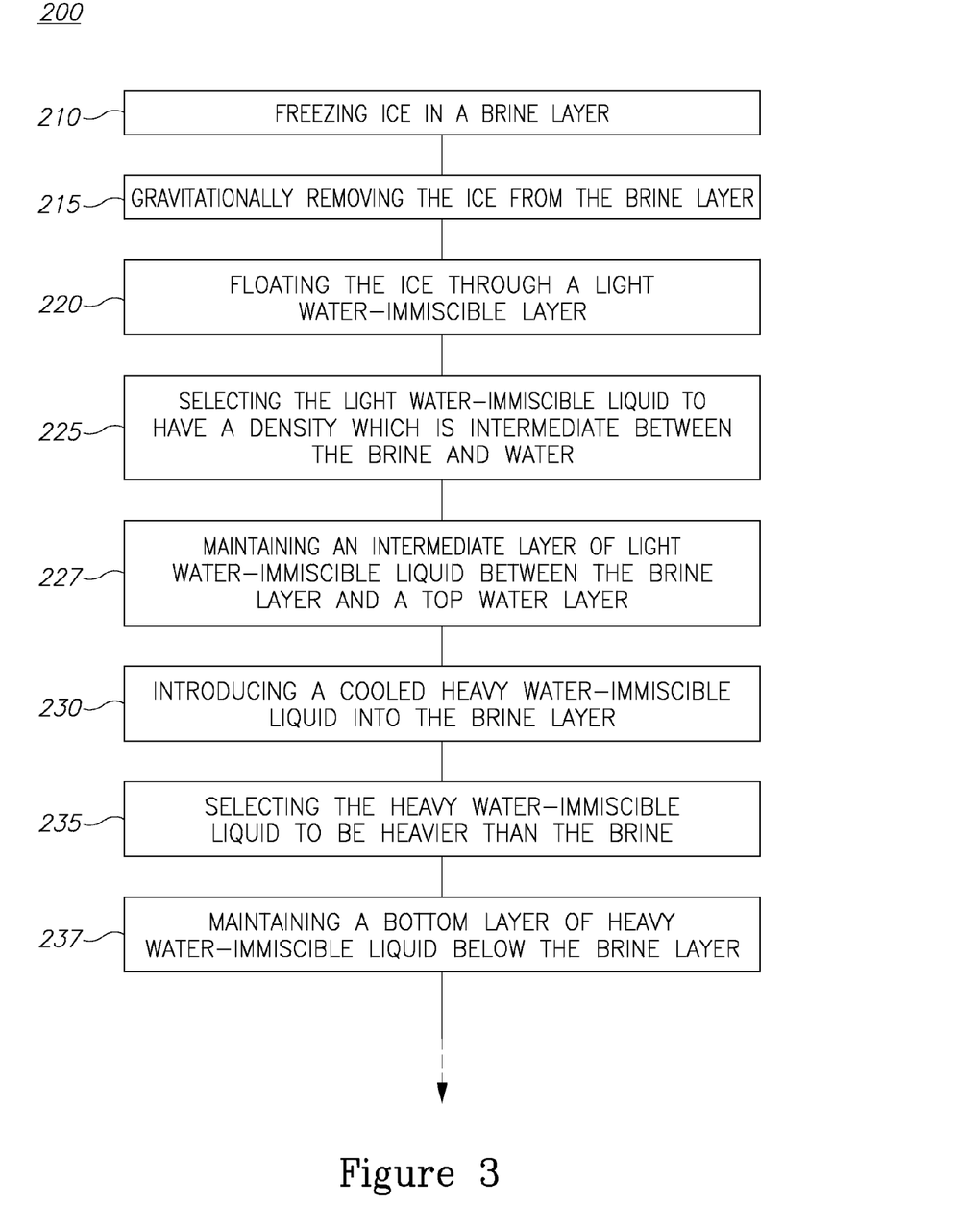
FIG. 3 is a high level schematic flowchart illustrating a desalination method according to some embodiments of the invention.

FIG. 3 is a high level schematic flowchart illustrating a desalination method 200 according to some embodiments of the invention. Desalination method 200 may comprise freezing ice in a brine layer (stage 210) by introducing a cooled heavy water-immiscible liquid into the brine layer (stage 230), wherein the heavy water-immiscible liquid is selected to have a density which is larger the brine density (stage 235), and gravitationally removing the ice from the brine layer (stage 215) by floating the ice through a light water-immiscible layer (stage 220) which is selected to have a density which is intermediate between the brine density and water density (stage 225). Method 200 may further comprise maintaining the intermediate layer of light water-immiscible liquid between the brine layer and the top water layer (stage 227).

Desalination method 200 may further comprise maintaining a bottom layer of heavy water-immiscible liquid below the brine layer (stage 237) and introducing brine into the bottom layer of the heavy water-immiscible liquid (stage 250) positioned below the brine layer. Desalination method 200 may further comprise cooling the introduced brine prior to its introduction into the bottom layer (stage 260), e.g., by removing concentrated brine from the brine layer (stage 262) and cooling the introduced brine by concentrated brine which is removed from the brine layer (stage 265). In certain embodiments, desalination method 200 may further comprise cooling the introduced brine (stage 260) by the top water layer that receives the floated ice from the light water-immiscible layer (stage 270). In such embodiments, the introduced brine may be used to melt the floated ice (stage 275).

Desalination method 200 may comprise cooling heavy water-immiscible liquid from the bottom layer for the introduction into the brine layer (stage 240), e.g., by water and/or ice removed from the top water layer positioned above the light water-immiscible layer (stage 245).

In certain embodiments, desalination method 200 may comprise removing water and/or ice from the top water layer (stage 280), rinsing delivered material by the removed water (stage 290), removing brine from delivered material using the removed water (stage 295) and delivering the removed brine to the brine layer (stage 297)

In some embodiments, method 200 is realized by a step-by-step accomplishment of the following main operations: (i) initial step-by-step bottom-up filling of the vertical vessel starting from the heaviest liquid (e.g., perfluoroheptane) up to the lightest one (fresh water) obtaining a four-layer column of two pairs on immiscible aqueous and non-aqueous liquids; (ii) organization of permanent perfluoroheptane circulation over the external refrigerating loop from the bottom layer through the refrigerator into the upper zone of the overlying layer of the brine to be desalinated with the subsequent output of strong water-salt concentration product out of the desalination process since the moment when the ice starts to freeze out; and (iii) heating of thawed water in the uppermost fresh-water layer of the upper pair of immiscible liquids by blind heat exchange with the initial dilute water-salt solution, which involves melting of ice continuously floating through all underlying liquid layers, which is frozen out of the brine, and a subsequent delivery of fresh water permanently accumulated at the top of this cascade to customers.

In certain embodiments, method 200 may further comprise controlling operation parameters by adjusting at least one of a quantity and a density of at least one of the heavy and light water-immiscible liquids (stage 299). For example, increasing an amount of liquids 80 and/or 70, reducing their density or increasing their viscosity (e.g., by mixing other liquids into respective layers 110A, 110E) prolongs the time heat is exchanged with water 50C and the time ice 50D floats through layer 110E, respectively.

Advantageously, the disclosed systems and methods are much more efficient and productive than other freeze desalination methods in that ice is formed within the brine and does not accumulate on the vessel walls. Furthermore, the present invention does not require either any special mechanical facilities containing moving parts or any cyclic operations, as do known desalination processes. The invention allows fresh water production in a continuous mode with a high efficiency and economic consumption of power resources without any risk of breaking working vessel in which the desalination process is realized.

Advantageously, the disclosed systems and methods provide closed regeneration cycles for water 50 and for heavy medium 80, which may be practical in various industries, e.g., for coal separation from waste rock. At proper production standards excluding its mechanical losses, such organization of coal concentration sets a coal concentration factory using such technology free from irreversible consumption of a respective amount of mineral salts required for replenishment of heavy water-salt liquid in its circulation loop. Furthermore, in comparison with known processes of water-salt solutions desalination, certain embodiments of the disclosed systems and methods exhibit significant process intensification, a higher level of energy perfection and absence of any mechanical facilities comprising moving parts for discharging ice from the place of its freezing-on. It is as important that such technological process does not involve any internal factors that can lead to breakdown of principal equipment used for its realization.

In certain embodiments, the invention may be of special interest for coal producing and coastal countries with severe weather conditions in winter. In this case, there is a direct opportunity of rational use of natural coldness for ice freezing out of dilute water-salt solutions (both of industrial origin and for sea water desalination) with the purpose of electric power saving. Just because of this, vertical working vessel 110 for the realization of the desalination process is equipped with removable cold insulation 112 that can be dismantled from its internal surface in winter. An additional advantage of the process is its high technological flexibility and easy adaptability to any technological disturbances arising in the system and changing external conditions. For this purpose, one can smoothly control the height of separate layers 110A, 110B, 110E, 110F inside such multi-layer column of liquids, and vary the densities used in each of non-aqueous liquid layers 80, 90, 70, 60. Besides, these corrections can be introduced into the desalination operation in the process of brine desalination, without stopping its principal production activity.

The following are non-limiting examples for the above, namely ways to influence process parameters by simple changes. For example, to prolong the time ice remains at the stage of washing residues of water-salt medium from its surface, one should only pour additional light water-immiscible liquid 70 (e.g., dibutyl phthalate) into layer 110E of the cascade without stopping the desalination process. In another example, to increase the velocity of dilute water-salt solution 50C floating up in bottommost layer 110A of heavy water-immiscible liquid 80 (e.g., perfluoroheptane), one can introduce, e.g., a heavier liquid (e.g., add tribromofluoromethane or tetrafluoro-dibromoethane) into heavy water-immiscible liquid 80 in the course of the process. On the contrary, to slow down the floating, heavy water-immiscible liquid 80 (e.g., perfluoroheptane) can be slightly diluted with a lighter liquid, e.g., dibutyl phthalate.

In certain embodiments, in order to prolong the time of recuperative cold-exchange between heavy water-immiscible liquid 80 (e.g., perfluoroheptane) leaving the desalination process and the initial dilute water-salt solution 50C floating up in it, it is sufficient to increase the height of this layer (e.g., layer 110A and/or layer 110B) or increase it height with a simultaneous introduction of, for example, hexane into heavy water-immiscible liquid 80. Such simple approaches allow easy control of the process in other cascade layers, as well, using the same principles.

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A desalination system comprising:
a vertical vessel having a four-layer column of alternating water-immiscible and aqueous layers with decreasing densities from a bottom to a top of the vessel, the column comprising:
a bottom layer of a heavy, water-immiscible, liquid;
a brine layer on top of the bottom layer;
an intermediate layer of a light, water-immiscible, liquid on top of the brine layer; and
a top water layer on top of the intermediate layer,
wherein a density of the heavy, water-immiscible, liquid is selected to be larger than a density of the brine, and a density of the light, water-immiscible, liquid is selected to be smaller than a density of the brine and larger than a density of the top water layer, and wherein the intermediate layer screens the top layer from the brine layer; and
a brine handling unit arranged to introduce brine into the bottom layer and remove concentrated brine from the brine layer,
wherein the desalination system is arranged to freeze water in the brine layer and enable floating of the ice from the brine layer through the intermediate layer to the top water layer.

2. The desalination system of claim 1, further comprising a cooling unit arranged to cool heavy, water-immiscible, liquid from the bottom layer and introduce the cooled heavy, water-immiscible liquid into the brine layer.

3. The desalination system of claim 2, wherein the cooling unit is arranged to cool the heavy, water-immiscible liquid using at least one of water and ice removed from the top water layer.

4. The desalination system of claim 1, further comprising at least one pre-cooling unit arranged to cool the introduced brine prior to its introduction into the bottom layer.

5. The desalination system of claim 4, wherein the at least one pre-cooling unit comprises a heat exchanger arranged to use the removed concentrated brine to cool the introduced brine.

6. The desalination system of claim 4, wherein the at least one pre-cooling unit comprises a cooling unit arranged to melt floated ice in the top water layer to cool the introduced brine.

7. The desalination system of claim 1, further comprising a water removal unit arranged to remove at least one of water and ice from the top water layer.

8. The desalination system of claim 7, further comprising a rinsing unit arranged to remove brine from delivered material using water from the removed at least one of water and ice, and provide the removed brine to the brine handling unit.

9. The desalination system of claim 1, wherein the heavy, water-immiscible liquid comprises at least one of: perfluoroheptane, cis-dibromoethylene, hexane mixtures with tetrafluorodibromoethane, halogenated derivatives of aliphatic hydrocarbons, dibromoethylene, a mixture of chloroform with at least one of: carbon tetrachloride trichloroethylene; methylene chloride; trans-1,2-dichloroethylene; trichloroethylene and ethyl bromide, as well as mixtures thereof.

10. The desalination system of claim 1, wherein the light, water-immiscible liquid comprises at least one of: dibutyl phthalate, furfural, a mixture of hexane with tribromofluoromethane, a mixture of pentane with tetrafluorodibromoethane, as well as mixtures thereof.

11. A rinsing system comprising the desalination system of claim 1 arranged to recycle rinsing water.

12. A desalination system comprising a liquid column that comprises alternating layers including at least two different water immiscible liquids having corresponding different densities and at least one salt solution, which form a vertical density gradient and exhibit a lower freezing zone from which ice floats to an upper melting zone, wherein cooling of introduced upwards flowing salt solutions is carried out by a countering downwards flow of a cold denser one of the at least two water immiscible liquid.

13. A desalination method comprising:
 freezing ice in a brine layer by introducing a cooled heavy, water-immiscible liquid into the brine layer, wherein the heavy, water-immiscible liquid has a density which is larger the a brine density; and
 gravitationally removing the ice from the brine layer by floating the ice through a light, water-immiscible layer having a density which is intermediate between the brine density and water density, the light, water-immiscible layer screening the top layer from the brine layer.

14. The desalination method of claim 13, further comprising introducing brine into a bottom layer of the heavy, water-immiscible liquid positioned below the brine layer.

15. The desalination method of claim 14, further comprising cooling the introduced brine prior to its introduction into the bottom layer.

16. The desalination method of claim 15, wherein the cooling is carried out by at least one of: concentrated brine which is removed from the brine layer, and a top water layer that receives the floated ice from the light, water-immiscible layer.

17. The desalination method of claim 14, further comprising cooling heavy, water-immiscible liquid from the bottom layer for the introduction into the brine layer.

18. The desalination method of claim 17, wherein the cooling is carried out by at least one of water and ice removed from a top water layer positioned above the light, water-immiscible layer.

19. The desalination method of claim 18, further comprising removing brine from delivered material using water from the removed at least one of water and ice, and delivering the removed brine to the brine layer.

20. The desalination method of claim 13, further comprising controlling operation parameters by adjusting at least one of a quantity and a density of at least one of the heavy, water-immiscible liquid and light, water-immiscible liquid.

* * * * *